United States Patent
Tsuiki et al.

(10) Patent No.: US 10,125,483 B2
(45) Date of Patent: Nov. 13, 2018

(54) SANITARY WASHING DEVICE

(71) Applicant: TOTO LTD., Kitakyushu-shi, Fukuoka (JP)

(72) Inventors: Shoichi Tsuiki, Kitakyushu (JP); Yuta Tanogashira, Kitakyushu (JP); Takeshi Yasugata, Kitakyushu (JP); Kenichi Okamoto, Kitakyushu (JP); Masami Tsujita, Kitakyushu (JP)

(73) Assignee: TOTO LTD., Kitakyushu-Shi, Fukuoka (JP)

( * ) Notice: Subject to any disclaimer, the term of this patent is extended or adjusted under 35 U.S.C. 154(b) by 0 days.

(21) Appl. No.: 15/682,643

(22) Filed: Aug. 22, 2017

(65) Prior Publication Data
US 2018/0058056 A1 Mar. 1, 2018

(30) Foreign Application Priority Data
Aug. 23, 2016 (JP) ................. 2016-162441

(51) Int. Cl.
*E03D 1/00* (2006.01)
*E03D 9/08* (2006.01)
*G01S 13/04* (2006.01)
*A47K 13/30* (2006.01)

(52) U.S. Cl.
CPC ............... *E03D 9/08* (2013.01); *G01S 13/04* (2013.01); *A47K 13/30* (2013.01)

(58) Field of Classification Search
CPC ............. E03D 9/08; G01S 13/04; A47K 13/30
USPC ............................................................ 4/313
See application file for complete search history.

(56) References Cited

U.S. PATENT DOCUMENTS

| | | | |
|---|---|---|---|
| 6,880,180 B2 * | 4/2005 | Hayashi ............... | E03D 9/08 4/313 |
| 8,082,607 B2 * | 12/2011 | Matsushita ............ | A47K 13/24 4/302 |
| 2003/0019023 A1 * | 1/2003 | Furukawa ............. | A47K 13/10 4/420.4 |
| 2005/0246828 A1 * | 11/2005 | Shirai ................. | E03D 9/08 4/420.4 |

* cited by examiner

Primary Examiner — Huyen Le
(74) Attorney, Agent, or Firm — Pearne & Gordon LLP

(57) ABSTRACT

A sanitary washing device according to an embodiment includes a toilet seat, a main part, and a radio wave sensor. The toilet seat is provided on a toilet. The toilet seat is pivotally supported by the main part. When the toilet seat is closed, the user in front of the main part is detected by the radio wave sensor in a first region, and in a second region higher than the first region. When the toilet seat is open, the user in front of the main part is not detected in the first region by the radio wave sensor, but the user in front of the main part is detected in the second region by the radio wave sensor. The position of the radio wave sensor is not changed between the state in which the toilet seat is open and the state in which the toilet seat is closed.

5 Claims, 5 Drawing Sheets

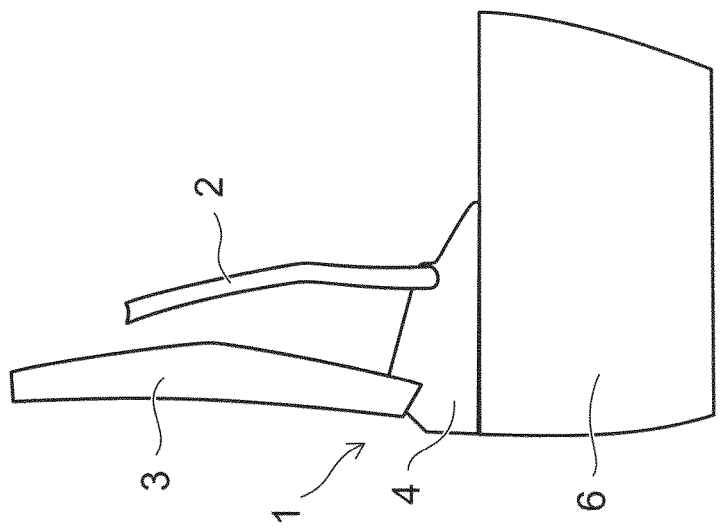
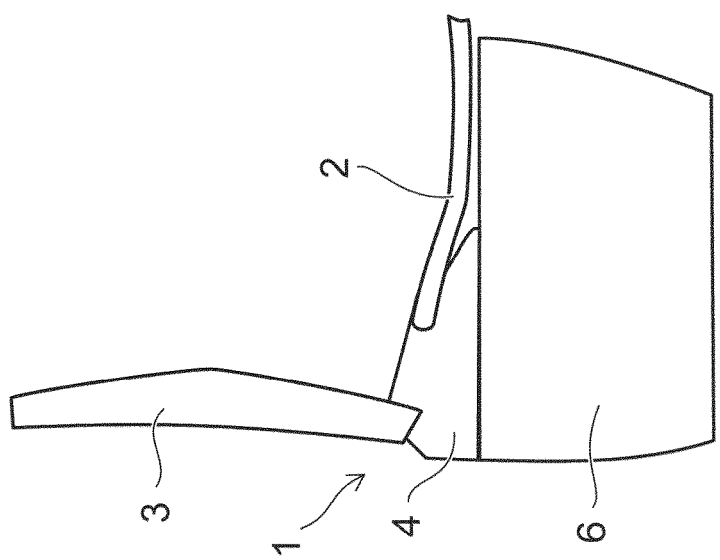
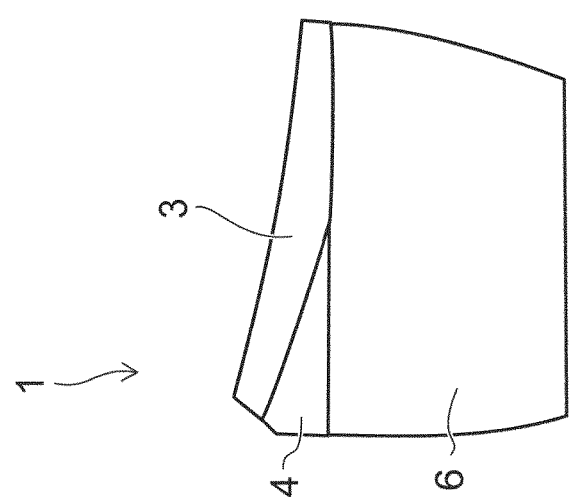
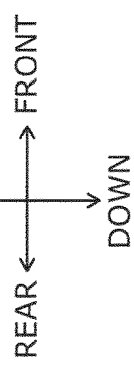

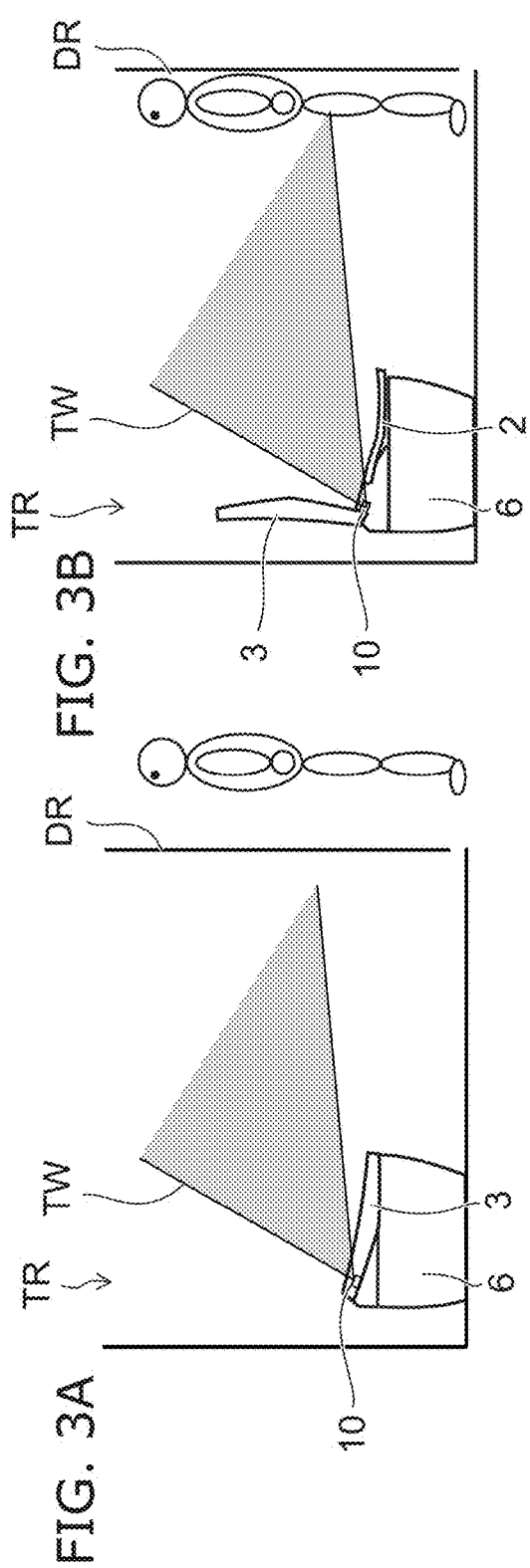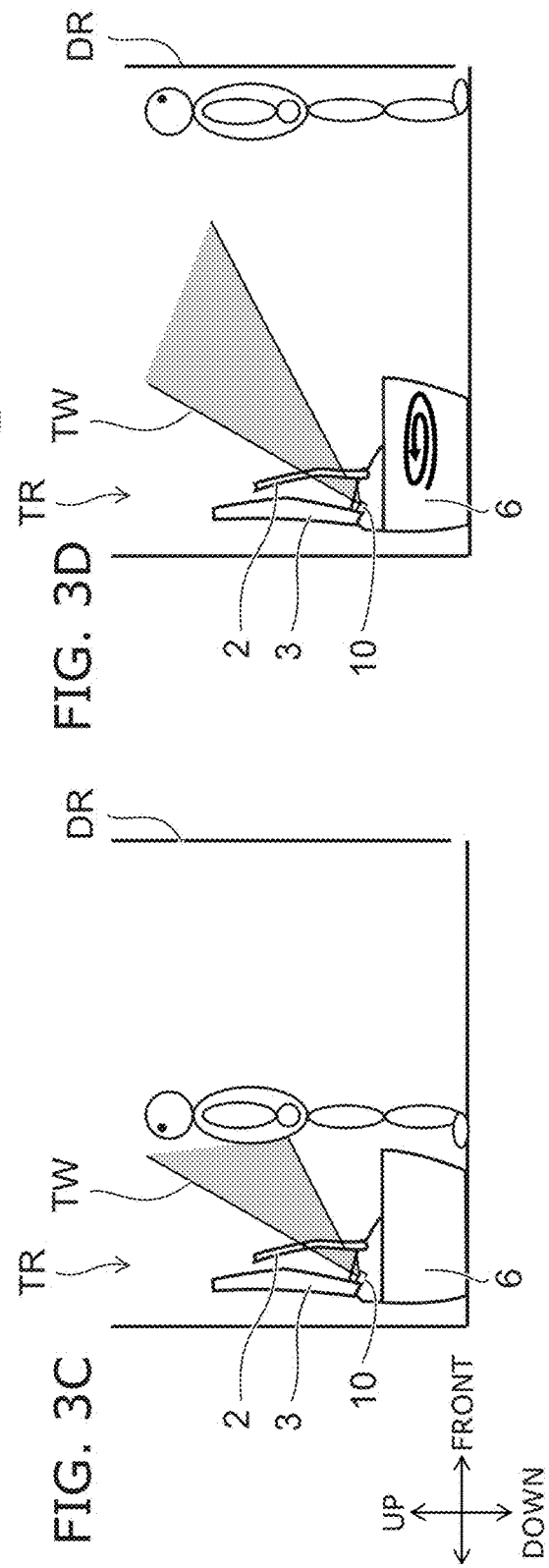

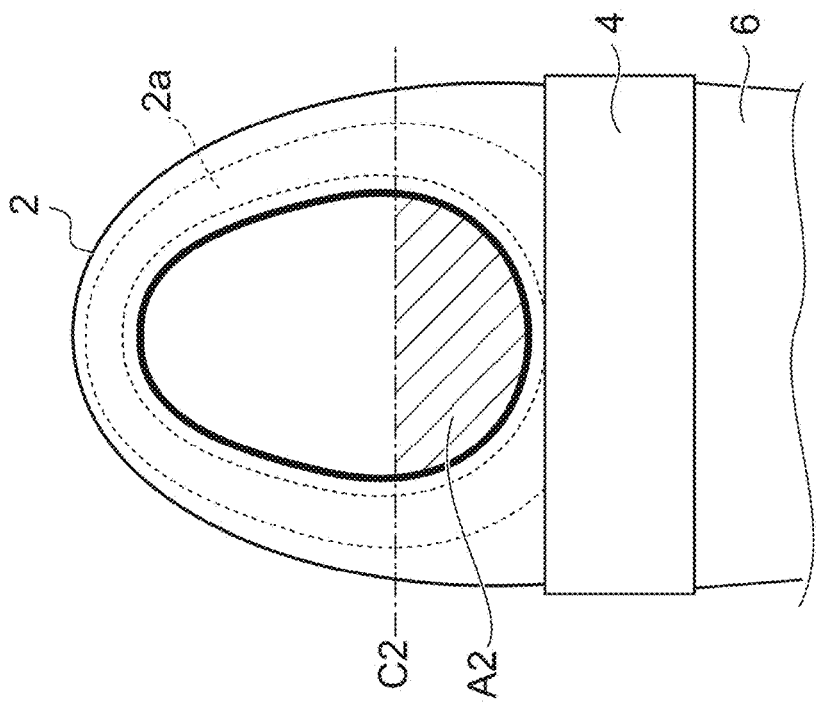
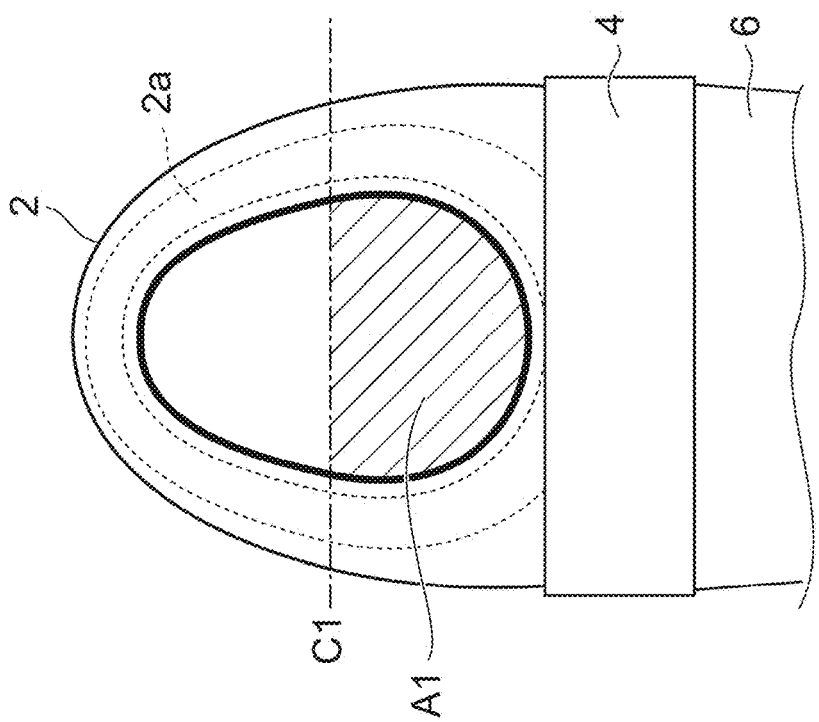
FIG. 4A
FIG. 4B

SANITARY WASHING DEVICE

CROSS-REFERENCE TO RELATED APPLICATIONS

This application is based upon and claims the benefit of priority from Japanese Patent Application No. 2016-162441, filed on Aug. 23, 2016; the entire contents of which are incorporated herein by reference.

FIELD

Embodiments described herein relate generally to a sanitary washing device.

BACKGROUND

A toilet apparatus that includes a human body detection sensor has been proposed. The human body detection sensor detects a user entering a toilet room, a user exiting the toilet room, etc. JP-A 2004-194999 (Kokai) discusses the following toilet apparatus. A low tank cover is mounted on the upper surface of the rear part of the toilet. A toilet seat and a toilet lid are mounted to be rotatable at the front edge lower part of the low tank cover. The human body detection sensor is mounted at the front surface part inside the low tank cover.

When the user uses the toilet apparatus, mainly there are the case where defecation is performed in a state of sitting on the toilet seat, and the case where standing urination is performed in a state of standing in front of the toilet apparatus. The user that is seated on the toilet seat can be detected relatively easily by using a seat contact sensor, etc., provided in the toilet seat. On the other hand, the user that performs standing urination is not detected easily in the case where the human body detection sensor detects the movement of the object as in a doppler sensor that uses a radio wave, because the user substantially does not move in front of the toilet apparatus.

If the movement of the user performing standing urination cannot be detected, there are cases where it is detected that the use of the toilet apparatus is finished even though the user is performing standing urination. In the case where the toilet apparatus is to receive the detection result and perform the washing of the toilet, the opening and closing of the toilet seat, etc., there is a possibility that such a misdetection may cause the toilet to be washed and/or the toilet seat and/or the toilet lid to be closed during the standing urination. Therefore, it is desirable for the sensor to be able to detect a slight movement of the user while the user is performing standing urination.

It may be considered to set the sensitivity of the sensor to be high as a method for detecting the movement of the user performing standing urination. However, if the sensitivity of the sensor is set to be high, there are cases where a human outside the toilet room is undesirably detected. In such a case, the human that is outside the toilet room continues to be detected even though the user has finished using the toilet apparatus and has exited the toilet room; and the washing of the toilet, etc., are not performed.

The invention is based on the recognition of such problems and is directed to provide a sanitary washing device in which misdetections do not occur easily, and the detection precision of the user performing standing urination can be increased.

SUMMARY

A sanitary washing device according to an embodiment includes a toilet seat, a main part, and a radio wave sensor. The toilet seat is provided on a toilet. The toilet seat is pivotally supported by the main part to be rotatable. The radio wave sensor is provided in the interior of the main part. The radio wave sensor detects a user in front of the main part by using a radio wave. In a state in which the toilet seat is closed, the user in front of the main part is detected by the radio wave sensor in a first region, and in a second region that is higher than the first region. In a state in which the toilet seat is open, the user in front of the main part is not detected in the first region by the radio wave sensor, but the user in front of the main part is detected in the second region by the radio wave sensor. The position of the radio wave sensor is not changed between the state in which the toilet seat is open and the state in which the toilet seat is closed.

BRIEF DESCRIPTION OF THE DRAWINGS

FIGS. 1A to 1C are side views illustrating a toilet apparatus including a sanitary washing device according to an embodiment of an invention;

FIGS. 3A to 3D are side views illustrating an example of the operation of the sanitary washing device according to the embodiment;

FIGS. 4A and 4B are rear views illustrating the sanitary washing device according to the embodiment.

DETAILED DESCRIPTION

Figure 2A:
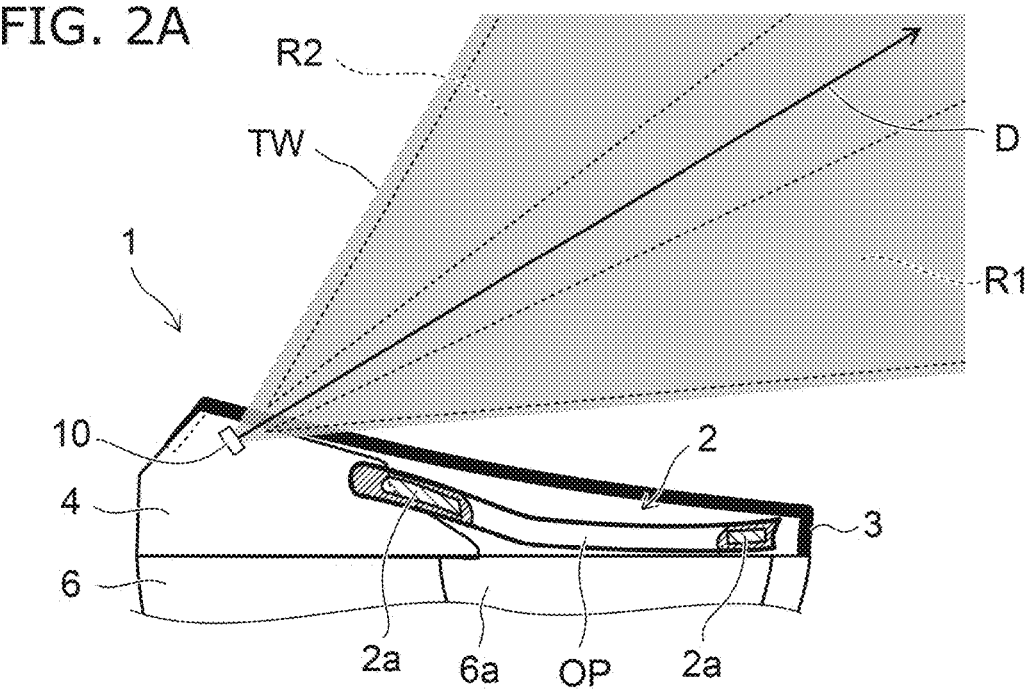
FIGS. 2A and 2B are cross-sectional views illustrating the sanitary washing device according to the embodiment.

A sanitary washing device of a first invention includes a toilet seat, a main part, and a radio wave sensor. The toilet seat is provided on a toilet. The toilet seat is pivotally supported by the main part to be rotatable. The radio wave sensor is provided in the interior of the main part. The radio wave sensor detects a user in front of the main part by using a radio wave. In a state in which the toilet seat is closed, the user in front of the main part is detected by the radio wave sensor in a first region, and in a second region that is higher than the first region. In a state in which the toilet seat is open, the user in front of the main part is not detected in the first region by the radio wave sensor, but the user in front of the main part is detected in the second region by the radio wave sensor. The position of the radio wave sensor is not changed between the state in which the toilet seat is open and the state in which the toilet seat is closed.

According to the sanitary washing device, the detection precision of the user performing standing urination can be increased while reducing the likelihood of a human other than the user being misdetected by the radio wave sensor.

In a sanitary washing device of a second invention, when the toilet seat is open, a maximum directivity direction of the radio wave radiated from the radio wave sensor in the first invention is pointed higher than the horizontal direction; and the maximum directivity direction passes through an opening of the toilet seat.

According to the sanitary washing device, it is possible to further increase the detection precision of the user performing standing urination.

In a sanitary washing device of a third invention, the maximum directivity direction when the toilet seat is open in the second invention passes through lower than a center in the vertical direction of the opening.

According to the sanitary washing device, the detection precision of a user of low stature such as a child, an older adult, etc., can be increased.

In a sanitary washing device of a fourth invention, the maximum directivity direction when the toilet seat is open in the second invention passes through lower than a portion of the opening having the widest width.

According to the sanitary washing device, the radio wave that is radiated from the radio wave sensor is not irradiated easily on something other than the user; and misdetections by the radio wave sensor can be suppressed even more.

In a sanitary washing device of a fifth invention, the radio wave sensor of any one of the first to fourth inventions is provided lower than an area where the opening is projected rearward when the toilet seat is open.

According to the sanitary washing device, misdetections by the radio wave sensor can be suppressed even more because the radio wave is not radiated easily on a human not at the vicinity of the sanitary washing device.

Embodiments of the invention will now be described with reference to the drawings. Similar components in the drawings are marked with the same reference numerals; and a detailed description is omitted as appropriate.

FIGS. 1A to 1C are side views illustrating a toilet apparatus including a sanitary washing device 1 according to the embodiment of the invention.

The toilet apparatus illustrated in FIGS. 1A to 1C includes a western-style sit-down toilet (for convenience of description hereinbelow, called simply the "toilet") 6, and the sanitary washing device 1 provided on the toilet 6. The sanitary washing device 1 includes a main part 4, a toilet seat 2, and a toilet lid 3. The toilet seat 2 and the toilet lid 3 each are pivotally supported rotatably by the main part 4.

FIG. 1A illustrates a state in which the toilet seat 2 and the toilet lid 3 are closed (lowered). FIG. 1B illustrates a state in which the toilet seat 2 is closed and the toilet lid 3 is open. FIG. 1C illustrates a state in which the toilet seat 2 and the toilet lid 3 are open (raised).

"Up," "down," "front," and "rear" are used in the description of the embodiments recited below. These directions are as viewed by a user seated on the toilet seat 2.

A private part washing function part that washes the "bottom" of the user seated on the toilet seat 2 and the like are built into the interior of the main part 4. A radio wave sensor 10 that is described below is provided in the interior of the main part 4. The radio wave sensor 10 is, for example, a doppler sensor that utilizes the doppler effect. The radio wave sensor 10 radiates a high frequency radio wave such as a microwave, a millimeter wave, etc., and receives the reflected wave from the detection object. Information that relates to the state of the detection object is included in the reflected wave. The entrance of the user into the toilet room and/or the movement of the user in front of the toilet seat are detected based on the radiated radio wave and the reflected wave.

The radio wave sensor 10 outputs the detection result to a controller such as a microcomputer, etc. The controller receives the detection result and performs, for example, the opening of the toilet lid 3, the washing of the toilet 6, the heating of the toilet seat 2, etc. Also, a fan, a deodorizing unit, etc., may be appropriately provided in the interior of the main part 4. The fan blows air toward the "bottom" or the like of the user seated on the toilet seat 2. The deodorizing unit deodorizes the interior of the toilet room.

Figure 2B:
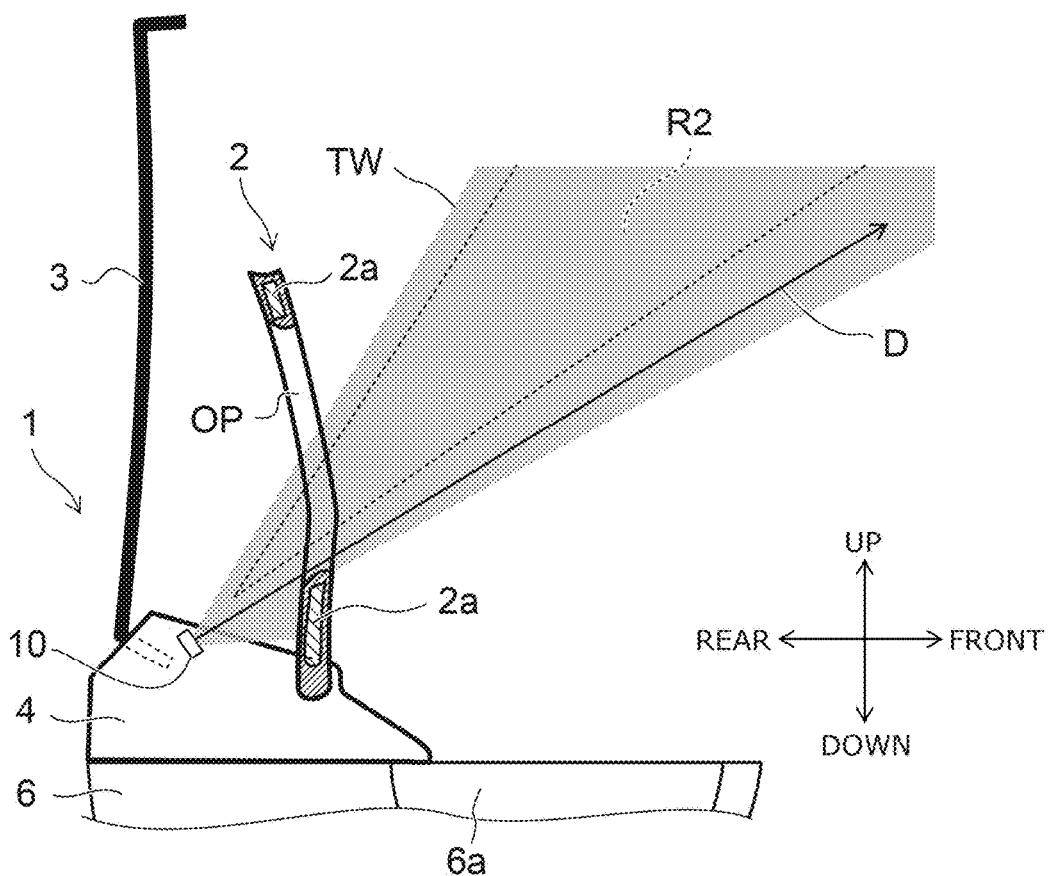

FIGS. 2A and 2B are cross-sectional views illustrating the sanitary washing device according to the embodiment.

FIG. 2A illustrates the state in which the toilet seat 2 and the toilet lid 3 are closed. FIG. 2B illustrates the state in which the toilet seat 2 and the toilet lid 3 are open.

As illustrated in FIG. 2A and FIG. 2B, a metal member 2a is provided as a heating element in the interior of the toilet seat 2 to warm the seating surface. For example, the metal member 2a is provided around an opening OP of the toilet seat 2. When the user is seated on the toilet seat 2, the toilet seat 2 is warmed by a current provided to the metal member 2a. For example, a tubing heater, a sheathed heater, a halogen heater, a carbon heater, or the like is used as the heater provided in the toilet seat 2. The metal member 2a includes, for example, aluminum, copper, etc. Various configurations such as a sheet configuration, a wire configuration, a mesh configuration, etc., may be employed as the configuration of the metal member 2a.

The toilet seat 2, the toilet lid 3, and the case of the main part 4 include a material such as a resin, etc., that easily transmits the radio wave. The metal member 2a reflects the radio wave without transmitting. A maximum directivity direction D of a radio wave TW radiated from the radio wave sensor 10 is tilted upward with respect to the horizontal direction.

The maximum directivity direction of the radio wave means the direction of the maximum value of the intensity distribution of the radiated radio wave. In the case where the radio wave is radiated from the radio wave sensor 10 to have maximum values in multiple directions, it is sufficient for at least one of the directions to be tilted upward with respect to the horizontal direction.

As illustrated in FIG. 2A, the maximum directivity direction D passes above the toilet seat 2 in the state in which the toilet seat 2 and the toilet lid 3 are closed. The radio wave TW that is radiated from the radio wave sensor 10 is radiated in a first region R1 in front of the radio wave sensor 10 and in a second region R2 that is higher than the first region R1. The first region R1 is, for example, a part of the region lower than the maximum directivity direction D. The second region R2 is, for example, a part of the region higher than the maximum directivity direction D.

As illustrated in FIG. 2B, the maximum directivity direction D passes through the opening OP of the toilet seat 2 in the state in which the toilet seat 2 is open. At this time, the radio wave that passes through the opening OP of the toilet seat 2 propagates as-is frontward. The radio wave that is incident on the toilet seat 2 is reflected by the metal member 2a and does not propagate frontward. As a result, the radio wave is not radiated in the first region R1 in the state in which the toilet seat 2 is open. The radio wave is radiated only in the second region R2.

A faint radio wave may be radiated in the first region R1. In other words, here, the meaning of the radio wave not being radiated in the first region R1 includes the following first state and second state. In the first state, the radio wave is not radiated at all in the first region R1. In the second state, a faint radio wave that is insufficient to detect the human body is radiated in the first region R1.

An example of the operation of the sanitary washing device 1 according to the embodiment will now be described with reference to FIGS. 3A to 3D.

FIGS. 3A to 3D are side views illustrating an example of the operation of the sanitary washing device according to the embodiment.

As illustrated in FIG. 3A, for example, the toilet seat 2 and the toilet lid 3 are closed when the user is outside a toilet room TR. Subsequently, the user is detected by the radio wave sensor 10 when the user enters the toilet room TR.

Thereby, as illustrated in FIG. 3B, the toilet lid 3 is opened by the controller of the sanitary washing device 1.

When the user performs standing urination, the user approaches the toilet apparatus; and, for example, the toilet seat 2 is opened by the hand of the user. At this time, a part of the radio wave TW radiated from the radio wave sensor 10 passes through the opening of the toilet seat 2; and another part of the radio wave TW is blocked by the toilet seat 2.

When the user is finished using the toilet apparatus, the user moves toward a door DR. At this time, when the radio wave sensor 10 detects that the user has moved away from the toilet apparatus, for example, the washing of the interior of the toilet 6 is performed by the controller. After washing the toilet 6, the controller may further close the toilet seat 2 and the toilet lid 3.

Thus, the components of the toilet apparatus are operated by receiving the detection result of the user from the radio wave sensor 10. In other words, if the user is not detected correctly by the radio wave sensor 10, it is difficult to operate the components of the toilet apparatus according to the behavior of the user.

In particular, as illustrated in FIG. 3C, there is a tendency for the movement of the user to be small while the user is performing standing urination; and the detection signal is small. Accordingly, if the radio wave sensor 10 cannot discriminate between the state of performing standing urination and the state after the user has exited the toilet room TR, the washing of the toilet 6 may be performed during the standing urination; or the toilet seat 2 and the toilet lid 3 may be closed.

As described above, it may be considered to increase the sensitivity of the radio wave sensor 10 to prevent the human body being detected as being absent even though the human body is present. This is because the human body can be detected for even a relatively small movement by increasing the sensitivity of the radio wave sensor 10. However, if the sensitivity of the radio wave sensor 10 is increased, there are cases where a human outside the toilet room TR is undesirably detected even after the user has finished using the toilet apparatus and has exited the toilet room TR. In such a case, the user is detected as being present even though the user is not inside the toilet room TR. The washing operation of the toilet 6, the operation of closing the toilet seat 2 and the toilet lid 3, etc., are not performed.

On this point, the following configuration is employed in the embodiment.

In the closed state in which the toilet seat 2 is closed as illustrated in FIG. 2A, the radio wave TW is not blocked by the metal member 2a of the toilet seat 2. The radio wave TW is radiated in the first region R1 and the second region R2. In the open state in which the toilet seat 2 is open as illustrated in FIG. 2B, the radio wave TW is radiated in the second region R2 through the opening OP of the toilet seat 2. The radio wave TW is reflected by the metal member 2a of the toilet seat 2 and is not radiated in the first region R1.

In other words, in the closed state of the toilet seat 2, the user is detected in the first region R1 and the second region R2. In the open state of the toilet seat 2, the user is not detected in the first region R1; but the user is detected in the second region R2.

Such a change of the detection area is realized by the opening and closing of the toilet seat 2 without changing the position of the radio wave sensor 10.

The propagation direction of the radio wave radiated in the first region R1 has a smaller tilt with respect to the horizontal direction than the propagation direction of the radio wave radiated in the second region R2. Therefore, even when the user is in a location separated from the toilet apparatus such as those illustrated in FIG. 3A and FIG. 3B, it is easy to detect the user by detecting the user in the first region R1 and the second region R2. By detecting the user only in the second region R2, it is easy to detect only the user proximal to the toilet apparatus as illustrated in FIG. 3C.

According to such a configuration, even in the case where the sensitivity of the radio wave sensor 10 is set to be high to increase the detection precision of the user performing standing urination, a human body other than the human body at the vicinity of the toilet apparatus is not detected easily while the toilet seat 2 is open. Accordingly, according to the embodiment, the likelihood that a human other than the user may be misdetected by the radio wave sensor 10 can be reduced; and it is possible to increase the detection precision of the user performing standing urination.

As illustrated in FIG. 2B, the radio wave TW is radiated so that the maximum directivity direction D passes through the opening OP of the toilet seat 2 in the state in which the toilet seat 2 is open. Thereby, the radio wave intensity in the second region R2 is increased; and it is possible to further increase the detection precision of the user performing standing urination.

A more desirable form of the sanitary washing device 1 will now be described with reference to FIGS. 4A and 4B and FIG. 5.

FIGS. 4A and 4B are rear views illustrating the sanitary washing device according to the embodiment.

Figure 5:
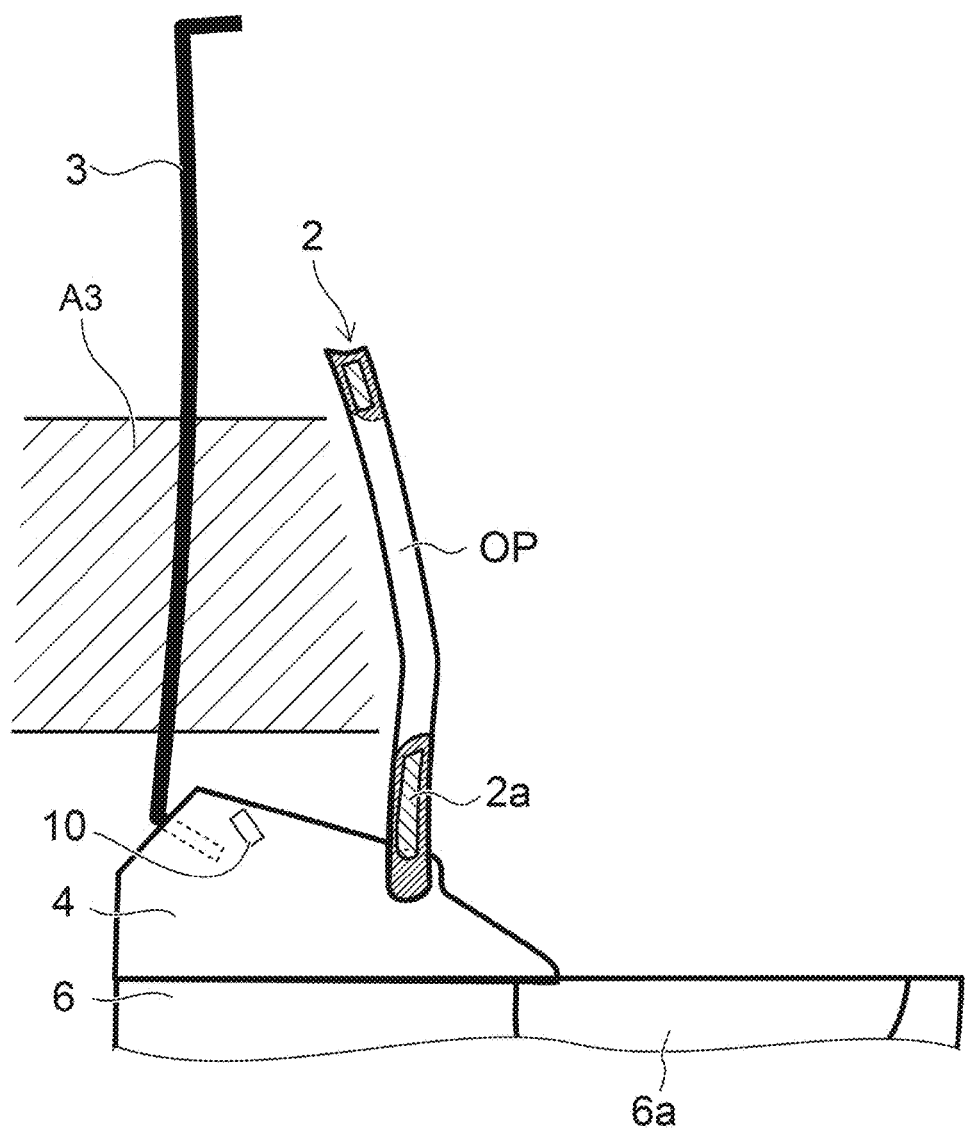
FIG. 5 is a side view illustrating the sanitary washing device according to the embodiment.

FIG. 5 is a side view illustrating the sanitary washing device according to the embodiment.

In FIGS. 4A and 4B, the state in which the toilet seat 2 is open is illustrated; and the toilet lid 3 is not illustrated.

It is desirable for the maximum directivity direction of the radio wave radiated from the radio wave sensor 10 to pass through lower than a center C1 in the vertical direction of the opening OP when the toilet seat 2 is open. In other words, it is desirable for the maximum directivity direction of the radio wave to pass through an area A1 illustrated in FIG. 4A. Thereby, the movement of the user is detected easily when a user of low stature such as a child, an older adult, or the like is performing standing urination; and the detection precision can be increased.

Generally, the opening of the toilet seat has an egg-like shape in which the rearward side in the closed state (the lower side in the open state) has the widest width. It is more desirable for the maximum directivity direction of the radio wave to pass through lower than a portion C2 of the opening OP having the widest width. In other words, it is desirable for the maximum directivity direction of the radio wave to pass through an area A2 illustrated in FIG. 4B.

Because the maximum directivity direction passes through on the lower side of the broad portion C2, the radio wave that spreads to the left and right sides is easily reflected by the metal member 2a inside the toilet seat 2. Therefore, the radio wave that is radiated from the radio wave sensor 10 is not irradiated easily on something other than the user; and the misdetections by the radio wave sensor 10 can be suppressed even more.

Further, as illustrated in FIG. 5, it is desirable for the radio wave sensor 10 to be provided lower than an area A3 of the opening OP of the toilet seat 2 projected rearward in the state in which the toilet seat 2 is open.

Thus, the maximum directivity direction of the radio wave radiated from the radio wave sensor 10 is tilted upward with respect to the horizontal direction; and the radio wave is not radiated easily on a human other than the human at the vicinity of the toilet apparatus. In other words, according to such a configuration, the misdetections by the radio wave sensor 10 can be suppressed even more.

The embodiments of the invention have been described above. However, the invention is not limited to the above description. Those skilled in the art can appropriately modify the design of the above embodiments. Such modifications are also encompassed within the scope of the invention as long as they include the features of the invention. For instance, the shape, dimension, material, layout, and placement of each element such as the sanitary washing device 1 are not limited to those illustrated, but can be suitably modified.

Furthermore, the elements of the above embodiments can be combined with each other as long as technically feasible. Such combinations are also encompassed within the scope of the invention as long as they include the features of the invention.

What is claimed is:

1. A sanitary washing device, comprising:
    a toilet seat provided on a toilet;
    a main part, the toilet seat being pivotally supported by the main part to be rotatable; and
    a radio wave sensor provided in an interior of the main part, the radio wave sensor detecting a user in front of the main part by using a radio wave,
    in a state in which the toilet seat is closed, the user in front of the main part is detected in a first region and a second region by the radio wave sensor, the second region being higher than the first region,
    in a state in which the toilet seat is open, the user in front of the main part is detected in the second region by the radio wave sensor, and the user in front of the main part is not detected in the first region by the radio wave sensor,
    a position of the radio wave sensor is not changed between the state in which the toilet seat is open and the state in which the toilet seat is closed.
2. The device according to claim 1, wherein
    a maximum directivity direction of the radio wave radiated from the radio wave sensor is pointed higher than a horizontal direction, and
    the maximum directivity direction passes through an opening of the toilet seat when the toilet seat is open.
3. The device according to claim 2, wherein the maximum directivity direction passes through lower than a center in a vertical direction of the opening when the toilet seat is open.
4. The device according to claim 2, wherein the maximum directivity direction passes through lower than a portion of the opening having the widest width when the toilet seat is open.
5. The device according to claim 1, wherein the radio wave sensor is provided lower than an area where the opening is projected rearward when the toilet seat is open.

* * * * *